(12) United States Patent
Kinkoh (10) Patent No.: US 9,767,077 B2
(45) Date of Patent: Sep. 19, 2017

(54) IMAGE PROCESSING APPARATUS, IMAGE PROCESSING METHOD, AND STORAGE MEDIUM THAT STORES PROGRAM

(71) Applicant: CANON KABUSHIKI KAISHA, Tokyo (JP)

(72) Inventor: Toshikaz Kinkoh, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 81 days.

(21) Appl. No.: 14/663,590

(22) Filed: Mar. 20, 2015

(65) Prior Publication Data

US 2015/0278163 A1    Oct. 1, 2015

(30) Foreign Application Priority Data

Mar. 28, 2014  (JP) .................................. 2014-070075

(51) Int. Cl.
| | |
|---|---|
| *G06F 17/00* | (2006.01) |
| *G06F 17/21* | (2006.01) |
| *G06F 17/24* | (2006.01) |
| *G06T 11/60* | (2006.01) |

(52) U.S. Cl.
CPC .......... *G06F 17/212* (2013.01); *G06F 17/248* (2013.01); *G06F 17/211* (2013.01); *G06F 17/24* (2013.01); *G06F 17/243* (2013.01); *G06T 11/60* (2013.01)

(58) Field of Classification Search
CPC .... G06F 17/212; G06F 17/211; G06F 17/248; G06F 17/24; G06F 17/243; G06T 11/60
USPC ................. 715/229–230, 246, 255, 762–764
See application file for complete search history.

(56) References Cited

U.S. PATENT DOCUMENTS

| | | | | |
|---|---|---|---|---|
| 2006/0198555 A1* | 9/2006 | Hosotsubo | .............. | G06T 11/60 382/162 |
| 2007/0291308 A1* | 12/2007 | Miyamoto | .............. | G06T 11/60 358/1.18 |
| 2009/0327875 A1* | 12/2009 | Kinkoh | ................. | G06F 17/248 715/255 |
| 2011/0320933 A1* | 12/2011 | Sanami | ................. | G06F 17/248 715/246 |
| 2013/0063736 A1* | 3/2013 | Chiba | ..................... | G06T 11/60 358/1.6 |

FOREIGN PATENT DOCUMENTS

JP          08-030597 A        2/1996

* cited by examiner

*Primary Examiner* — Quoc A Tran
(74) *Attorney, Agent, or Firm* — Fitzpatrick, Cella, Harper & Scinto (57) ABSTRACT

The attribute of an object to be newly inserted into image data is determined based on an attribute of an object of a type corresponding to the object to be inserted from one or a plurality of objects already included in the image data. A display device is caused to display the image data in which the object having the determined attribute is inserted.

33 Claims, 7 Drawing Sheets

FIG. 8

IMAGE PROCESSING APPARATUS, IMAGE PROCESSING METHOD, AND STORAGE MEDIUM THAT STORES PROGRAM

BACKGROUND OF THE INVENTION

Field of the Invention

The present invention relates to an image processing apparatus for performing layout processing of image data, an image processing method, and a storage medium that stores a program.

Description of the Related Art

There are known various kinds of application software (to be referred to as applications hereinafter) configured to create the page designs of posters, catalogs, presentation data, postcards, leaflets/advertisements, and the like. These page design applications to create page designs have a DTP (DeskTop Publishing) function. For example, the applications have a function of adding a shading or decorating effect to an image or character and a print function of outputting data to a large format printer as well as a function of laying out and editing the constituent elements, for example, images, characters, and clip arts of a page design.

The page design applications are roughly classified into expensive high-performance applications used by professional designers and relatively inexpensive general-purpose applications featuring simple operation and processing. A user who has insufficient knowledge about layout design/color design needs a very long time to create a desired page design from the ground up. In addition, a result desirable from the viewpoint of design is not always obtained. To create a page design desirable from the viewpoint of design, know-how and basic design knowledge about layout and coloring are necessary.

For this reason, the general-purpose page design applications often include materials to efficiently create a page design, for example, design templates (patterns), clip art, and photographic images to implement a high-quality page design by simple operations. A user selects a design template close to the imagination of a complete form of a target page design. The user then executes minimum editing operations such as replacement/addition/change of photographic images/texts/materials and decorating effect application as need, thereby completing the page design.

Japanese Patent Laid-Open No. 08-030597 describes preparing design templates in advance and causing a user to input additional information. Japanese Patent Laid-Open No. 08-030597 describes an arrangement that, when inserting a character string into a predetermined layout region capable of character input, changes the character layout method (format) in accordance with the contents of the character string and then inserts it. Further, the user needs to appropriately set the layout of the layout frame itself and the format rule in advance.

In a system that provides a poster or the like, that has already undergone basic design, as a design template, the attributes of an object added by a user operation may be inconsistent with the design template in terms of design without any processing. Hence, if the user does not recognize it, an undesirable design is completed. Even if the user recognizes, the operation procedure increases and lowers the user's operation efficiency. Additionally, since the user himself/herself needs to determine the attributes after change, an undesirable design may still be created.

SUMMARY OF THE INVENTION

An aspect of the present invention is to eliminate the above-mentioned problems with the conventional technology. The present invention provides an image processing apparatus that appropriately inserts an object in consideration of an object existing in editing target image data, an image processing method, and a storage medium that stores a program.

The present invention in one aspect provides an image processing apparatus comprising: a determination unit configured to determine an attribute of an inserted object to be newly inserted into image data based on an attribute of an object of a type corresponding to the inserted object, by specifying the object from one or a plurality of objects already included in the image data; and a display unit configured to cause a display device to display the image data in which the object having the attribute determined by the determination unit is inserted.

According to the present invention, it is possible to appropriately insert an object in consideration of an object existing in editing target image data.

Further features of the present invention will become apparent from the following description of exemplary embodiments with reference to the attached drawings.

DESCRIPTION OF THE EMBODIMENTS

Preferred Embodiments of the Present Invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same constituent elements, and a description thereof will be omitted.

Figure 1:
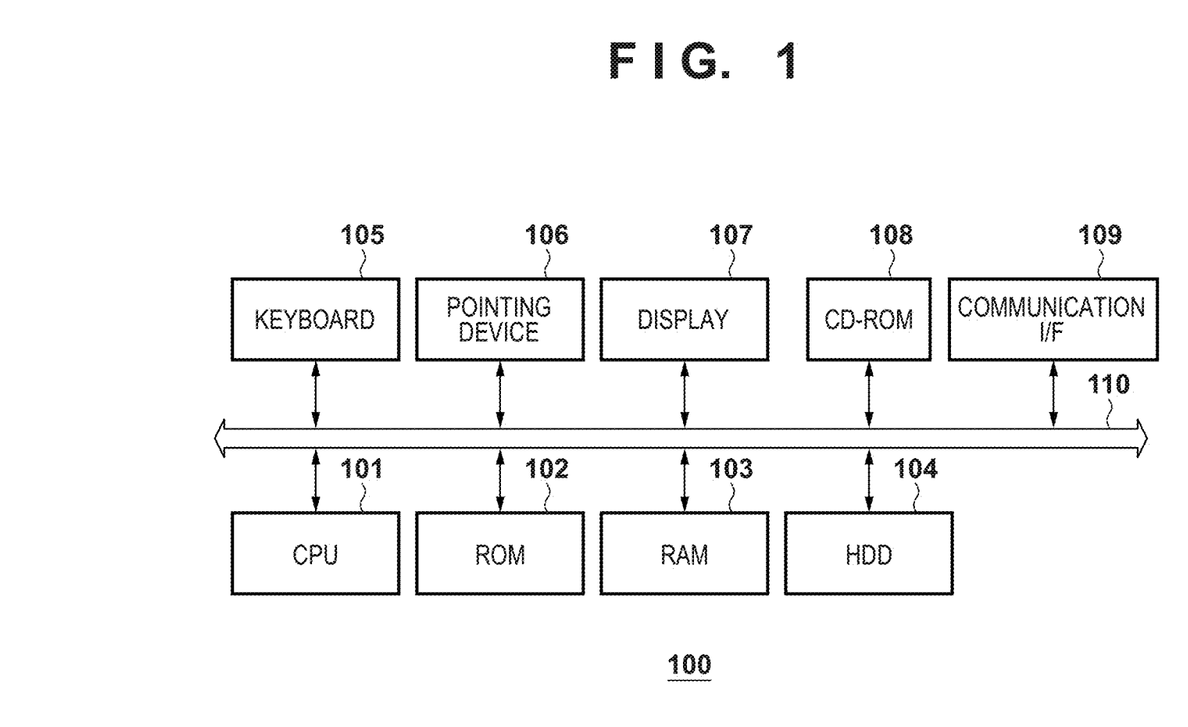
FIG. 1 is a block diagram showing the arrangement of an information processing apparatus.

FIG. 1 is a block diagram showing the arrangement of an information processing apparatus 100 according to the embodiment. In this embodiment, the information processing apparatus 100 operates as an image processing apparatus that performs image processing such as layout editing for image data. For example, a general-purpose PC is used as the information processing apparatus 100. A CPU 101 shown in FIG. 1 generally controls the entire information processing apparatus 100, and implements the operation of this embodiment by, for example, reading out a program stored in a ROM 102 to a RAM 103 and executing it. A hard disk (HDD) 104 stores an OS (Operating System), a web browser, other applications, and the like.

A keyboard 105 and a pointing device 106 are input devices configured to receive an operation instruction from the user. A display 107 is a display device such as an LCD and, in this embodiment, displays an editing screen used by the user to do layout editing. The user can input an instruction or setting on the editing screen using the keyboard 105 or the pointing device 106. A CD-ROM 108 is used as a nonvolatile data source. The keyboard 105 to the CD-ROM 108 are connected to a system bus 110 via device interfaces (not shown).

A communication interface (IF) 109 connects the information processing apparatus 100 to an external network such as LAN and enables communication with an external apparatus. For example, the information processing apparatus 100 also operates as a printing control apparatus that generates a job to control an external printer (printing apparatus) and transmits it to the printer via the communication IF 109. The system bus 110 communicably connects the CPU 101 to the communication IF 109 to each other. In addition to the above blocks, a Floppy® disk drive, DVD-ROM, USB memory, and the like may be connected to the system bus 110.

In this embodiment, the information processing apparatus 100 executes a design application stored in the ROM 102 or the HDD 104. The design application is an application used by the user to perform a design editing operation according to application purposes such as office document, poster, postcard, and presentation. The design application has various layout functions (to be simply referred to as editing functions hereinafter) necessary for the user to do the design operation. The design application has editing functions of, for example, resizing, moving, rotating, and selecting a constituent element (object) of an editing target document, correcting an image, editing a text, decorating a photographic image or text, and setting the background. The user can instruct and execute the functions using an input devices such as the keyboard 105 or the pointing device 106.

Figure 2:
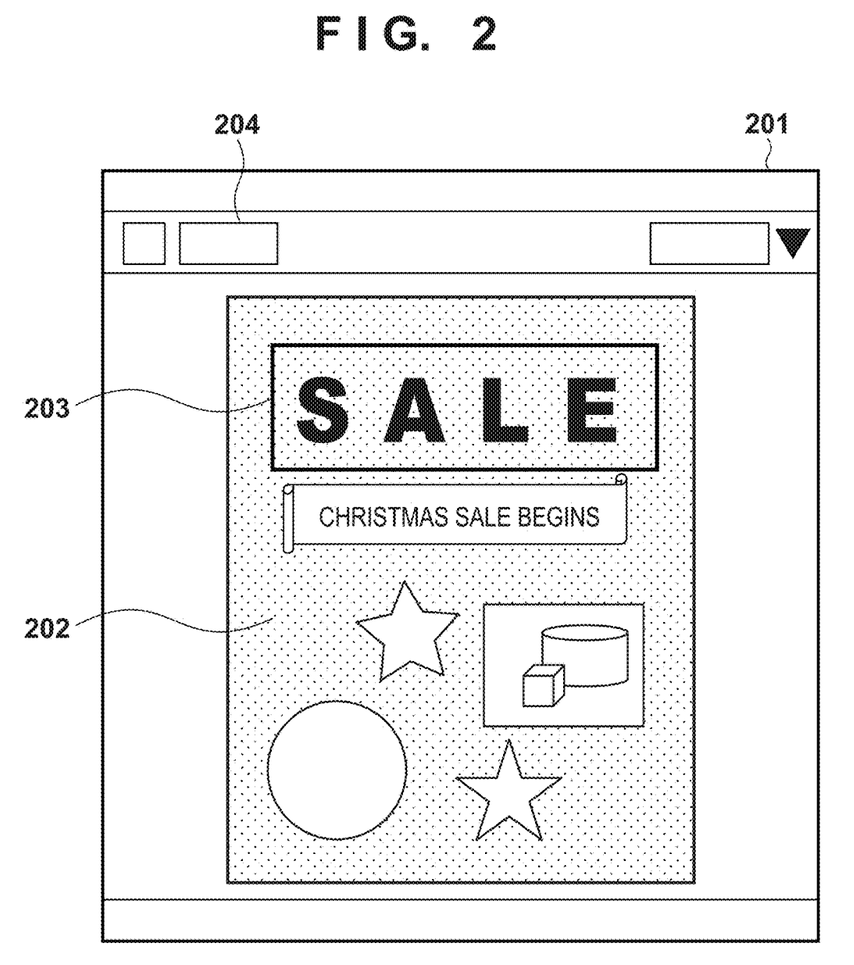
FIG. 2 is a view showing an example of the main screen of a design application.

FIG. 2 is a view showing an example of the main screen of the design application. A main screen 201 shown in FIG. 2 is displayed on the display 107 when the CPU 101 activates the design application. The design application includes a plurality of types of design templates that are prepared in advance and are arbitrarily selectable and usable by the user. The main screen 201 displays, in a preview region 202, a design template selected by the user out of the design templates prepared in advance.

The main screen 201 includes a menu and a tool bar used to execute the editing functions and buttons to determine or cancel a user operation in addition to the preview region 202. Using the menu or tool bar, the user can display a list of design elements (to also be referred to as art marks hereinafter) such as photographic images, clip arts, photographic image frames, decorated characters, and backgrounds and select a desired art mark.

When the user selects an editing target document and a desired page in the document using the menu or tool bar in the main screen 201, the CPU 101 displays the document or page in the preview region 202. FIG. 2 shows a state in which a page selected by the user is displayed in the preview region 202. The user can execute the editing functions for each constituent element on the page displayed in the preview region 202.

In this embodiment, the editing target is a document formed from one page. However, the editing target may be a document formed from a plurality of pages. In this case, the user can display the editing target page in the preview region 202 using a page move command button formed on the main screen 201 and used to move to an arbitrary page.

FIG. 2 shows a state in which a character string object 203 "SALE" is selected by the user on the page displayed in the preview region 202. The main screen 201 also includes a menu and a tool bar to execute editing support functions such as a guide, grid, and ruler. Using them, the user can execute the editing functions for the selected object.

A text addition button 204 is an addition button used to additionally insert a desired text (character string) into the editing target page displayed in the preview region 202. When the text addition button 204 is pressed, the design application displays an input screen used by the user to input a text. In this embodiment, the user can insert, as a character string object, the text input on the input screen displayed by the text addition button 204 into the page displayed in the preview region 202.

Although not illustrated in FIG. 2, the main screen 201 also includes a menu, a button, and the like to execute other functions such as a dropdown list used to designate the display magnification of the preview region 202.

A procedure of causing the user to insert a desired character string object into a design template attached to the design application in advance and complete a design will be described below. The user instructs to execute a design template list display function using the menu or tool bar of the main screen 201. In accordance with the instruction, the CPU 101 displays a list of design templates attached to the design application in advance. The user selects, from the list, a design template having a design motif or object layout close to the expectation of the user himself/herself. In accordance with the selection, the CPU 101 displays the design template selected by the user in the preview region 202.

Figure 3:
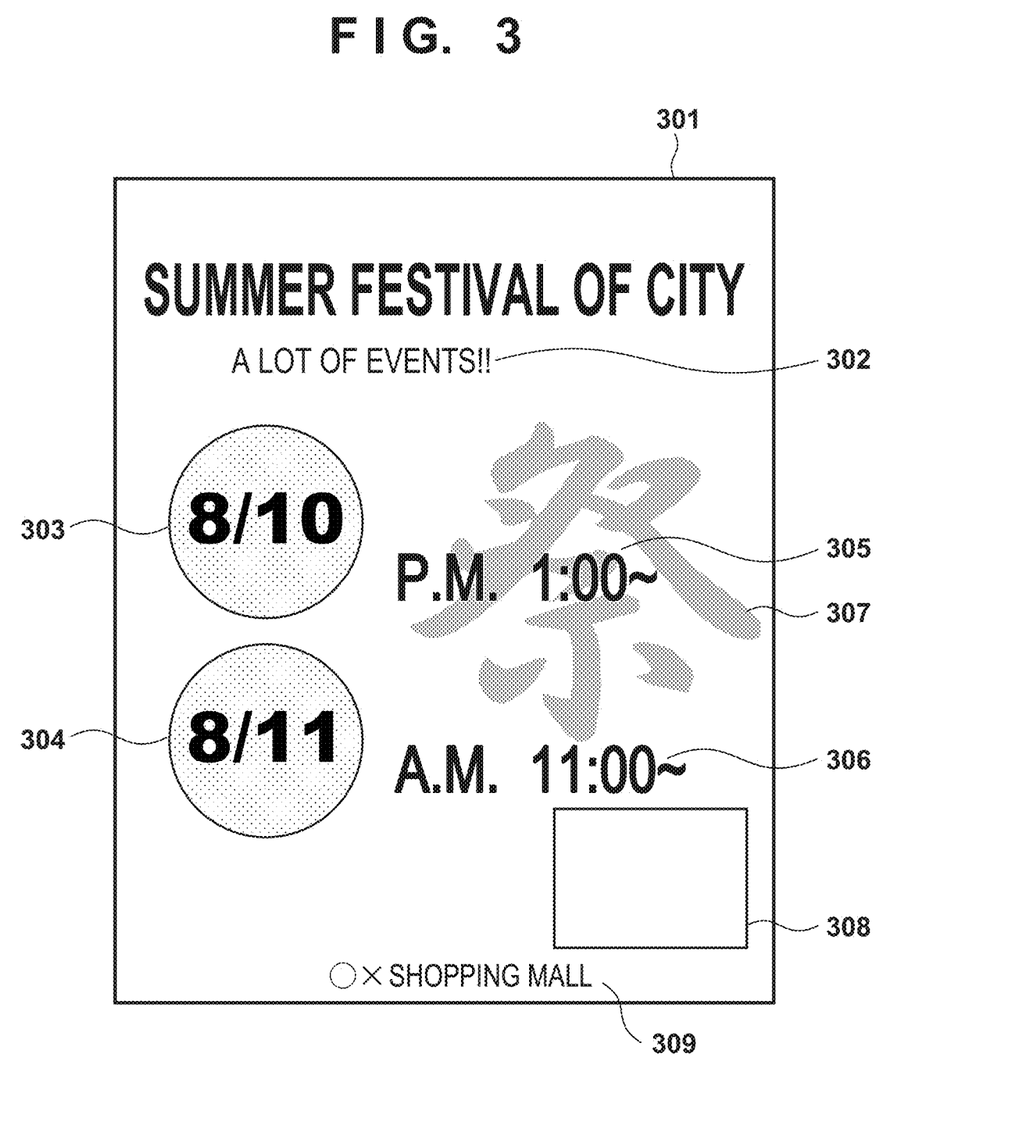
FIG. 3 is a view showing an example of a design template.

FIG. 3 is a view showing an example of a design template selected by the user and displayed in the preview region 202. The design template shown in FIG. 3 is a template representing an event announcement poster, and includes character string objects 301, 302, 305, 306, and 309, image objects 307 and 308, and composite objects 303 and 304. The character string object 301 is an object representing the title of the event announcement poster. The character string object 302 is an object representing a subtitle. The character string objects 305 and 306 are objects representing times to hold the event. The character string object 309 is an object representing the host of the event. The image object 307 is an object representing a background image. The image object 308 is an object representing a map image around the event venue. Each of the composite objects 303 and 304 is an object formed by grouping a graphic object (circular graphic in FIG. 3) and a character string object. Referring to FIG. 3, the character string objects in the composite objects 303 and 304 are objects representing days to hold the event.

The character string objects included in the design template shown in FIG. 3 have attribute values as shown in Table 1.

TABLE 1

| Object | Character type | Character color | Character size | Number of characters |
|---|---|---|---|---|
| Character string object 301 | round gothic A | (255, 255, 255) | 210 | 6 |
| Character string object 302 | Gothic pointed letter A | (255, 255, 255) | 70 | 12 |

TABLE 1-continued

| Object | Character type | Character color | Character size | Number of characters |
|---|---|---|---|---|
| Composite object 303 | round gothic B | (0, 0, 255) | 120 | 4 |
| Composite object 304 | round gothic B | (0, 0, 255) | 120 | 4 |
| Character string object 305 | Gothic pointed letter B | (255, 255, 0) | 80 | 8 |
| Character string object 306 | Gothic pointed letter B | (255, 255, 0) | 80 | 9 |
| Character string object 309 | Gothic pointed letter B | (255, 255, 255) | 60 | 5 |

In this embodiment, each character string object has a character type representing a font face, a character color, a character size, and the number of characters as attribute values, as shown in Table 1. For example, as for the attribute values of the character string object 301, the character type (font face) is "round gothic A", the character color is white that is (255, 255, 255) in the 8-bit RGB expression, the character size is 210 point, and the number of characters is 6. Note that for the composite objects 303 and 304, the attribute values of the character string objects in the composite objects are shown.

A procedure of causing the user to insert a desired character string object into the design template will be described next. The user presses the text addition button 204 on the main screen 201. In response to the press, the CPU 101 displays a text input screen on the display 107. The text input screen is displayed as, for example, a subscreen of the main screen 201.

Figure 4:
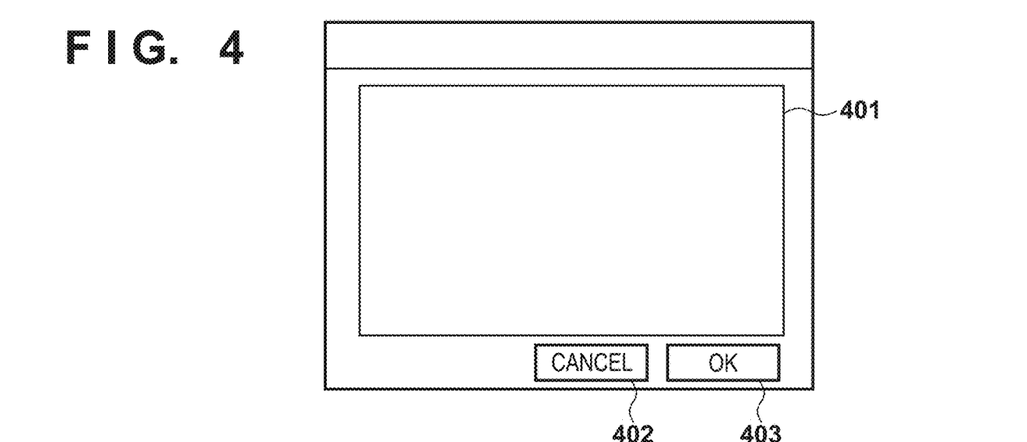
FIG. 4 is a view showing an example of a text input screen.

FIG. 4 is a view showing an example of the text input screen. When the text input screen as shown in FIG. 4 is displayed, the user inputs a desired text into a text input region 401 using the keyboard 105 or the pointing device 106. When an OK button 403 is pressed, the CPU 101 determines the input text contents. When a cancel button 402 is pressed, the CPU 101 cancels the input text contents. Alternatively, a character string created by the user on another application without using the text input screen may be added to the page under editing in the preview region 202 by a copy-and-paste operation via a clipboard provided by the operating system.

When the user inputs a text to the text input region 401 and presses the OK button 403, insertion processing of inserting a character string object into the page under editing in the preview region 202 starts. The insertion processing is performed in the order of decision of the insertion position of the object, decision of the attribute of the object to be inserted, and insertion of the object.

Figure 5:
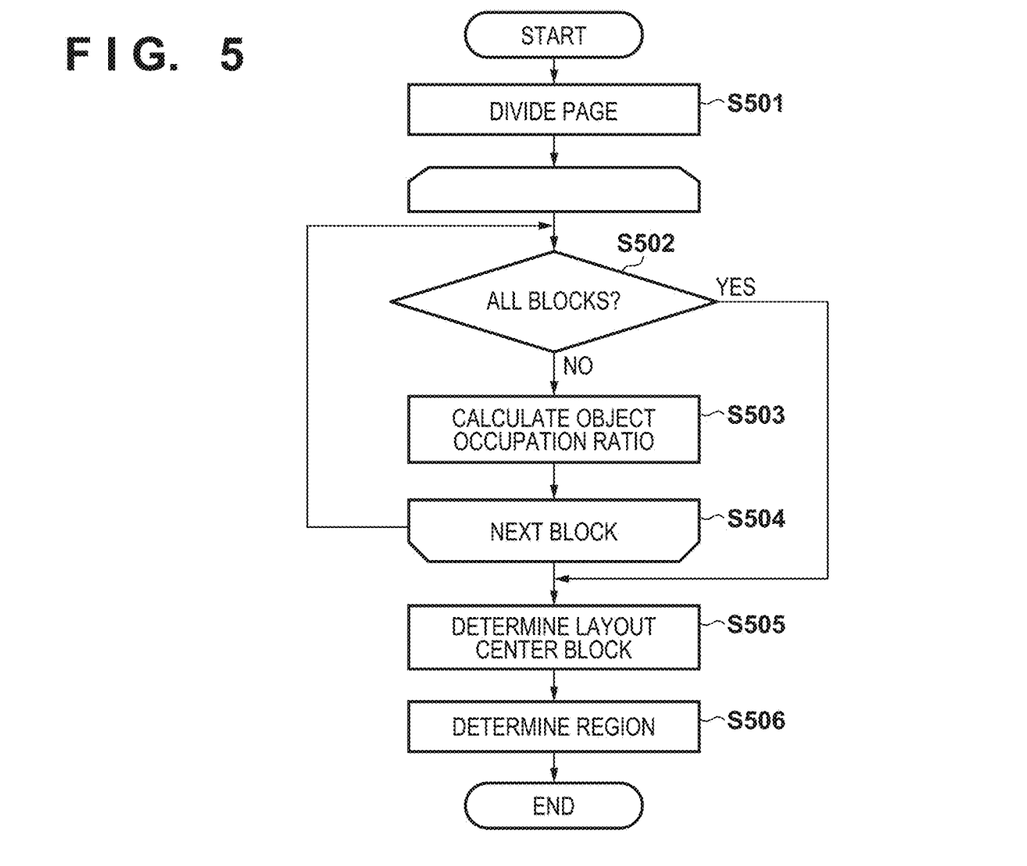
FIG. 5 is a flowchart showing the procedure of object insertion position decision processing.
Figure 6A:
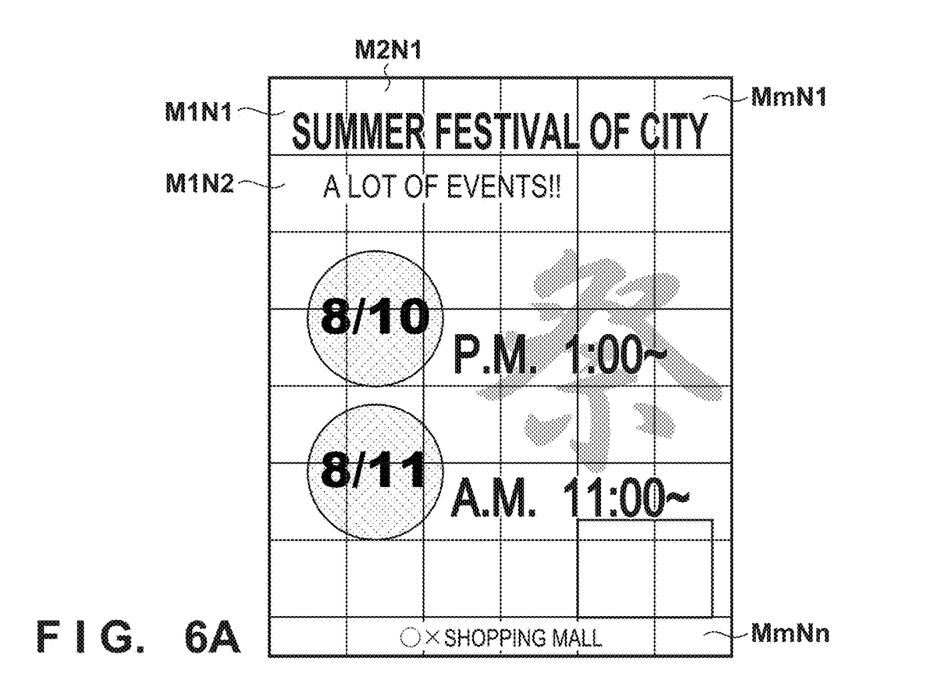
FIGS. 6A and 6B are views for explaining object insertion position decision processing.

FIG. 5 is a flowchart showing the procedure of object insertion position decision processing. In step S501, the CPU 101 divides the page data displayed in the preview region 202 into m×n (m and n are integers) block data. FIG. 6A shows the image of page data divided into block data. Here, the blocks are denoted by M1N1, M2N1, . . . , MmNn from the upper left to the lower right for the descriptive convenience.

In steps S502 to S504, the ratio of the object occupation area is calculated for each block data. In step S502, the CPU 101 determines whether the process of step S503 has been done for all block data. Upon determining that the process has been done for all block data, the process advances to step S505. Upon determining that the process has not been done for all block data, the process advances to step S503.

In step S503, the CPU 101 calculates the ratio of the object occupation area in the current block data of interest. For example, in a block M5N4 shown in FIGS. 6A and 6B, the occupation area of the image object 307 is calculated as 100%. If a plurality of types of objects overlap in a block, the sum of the occupation areas of the objects is calculated. Hence, the ratio of the occupation area calculated in step S503 may exceed 100%.

In step S504, the CPU 101 repeats the process from step S502 for the next block data as the processing target in step S503. Processing target block data is decided in an order capable of covering all block data of page data. For example, in FIGS. 6A and 6B, the processing target block data can be decided in the order of M1N1, M2N1, . . . , MmNn from the upper left to the lower right.

In step S505, the CPU 101 compares the ratios of occupation areas calculated for the block data, and decides (determines) a block having a minimum occupation area ratio as the center (center block) of the layout position of the character string object to be inserted. Assume that a block M3N7 in FIG. 6A is decided as the center block. If a plurality of block data whose calculated occupation areas equal are found, a selection screen may be displayed concerning which block data should be decided as the center block, and the center block may be decided in accordance with the selection.

Figure 6B:
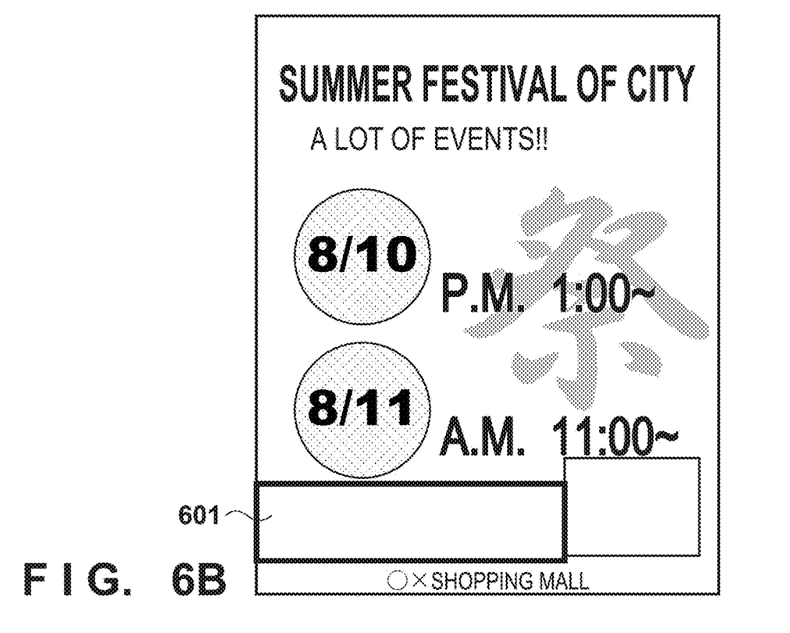

In step S506, the CPU 101 decides (determines) the layout region of the character string object to be inserted. The layout region is a rectangular region to lay out the character string input to the text input region 401 by the user. The CPU 101 specifies the center block M3N7 decided in step S505 as a reference rectangular region in the initial size. The CPU 101 moves the upper, lower, left, and right sides of the reference rectangular region outward until they come into contact with other objects. FIG. 6B is a view showing the object layout region decided in step S506. FIG. 6B shows a state in which the region of the center block M3N7 decided in FIG. 6A is extended to a region 601.

The objects may already overlap when deciding the center block in step S505. In this case, the CPU 101 moves the sides of the center block inward until they cease from overlapping neighboring objects, thereby reducing the region of the center block. Without enlarging the reference rectangular region and changing the size of the center block, the reference rectangular region may be decided as the layout region of the character string object to be inserted.

Processing of automatically deciding the object insertion position on the design application has been described above. However, the user may decide the desired insertion position of the object on the preview region 202 using an input device such as the pointing device 106.

Next, the attributes of the character string object to be laid out in the layout region decided in step S506 are decided. The text input by the user to the text input screen in FIG. 4 does not necessary match the design template shown in FIG. 3 depending on the character type, the character color, and the character size. In this embodiment, optimum attributes (character type, character color, and character size) in the layout region decided in step S506 are decided.

Figure 7:
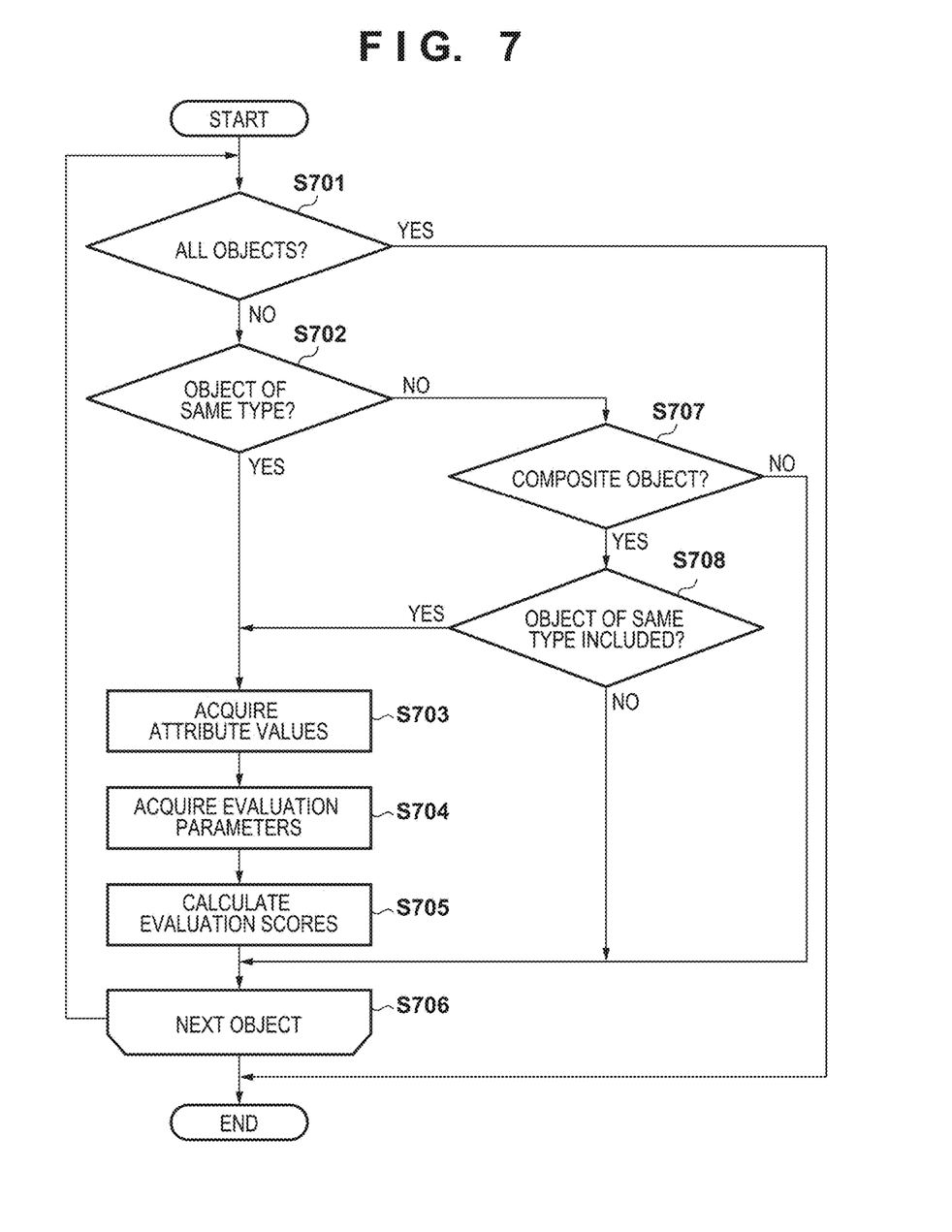
FIG. 7 is a flowchart showing the procedure of object attribute decision processing.

FIG. 7 is a flowchart showing the procedure of object attribute decision processing. In this processing, evaluation scores are calculated on an attribute basis for all objects of the same type as the object to be inserted. The attributes of each object already included in the design template have specific degrees of influence of the display image (for example, poster) represented by the design template. Hence, the design template can be said to have an ideal state where the degrees of influence given by the attributes of the objects balance. Hence, the object to be inserted preferably has attributes considering the attributes of the other objects in the display image. The evaluation scores can be said to play a role of indices representing the applicability of the attributes of each object to the object to be inserted.

In this embodiment, an evaluation score is calculated for each attribute (character type, character color, and character size) of each character string object in the page. For a composite object, the attributes of a character string object included in it are the subjects of the calculation. An image object is of a type different from that of the character string object to be inserted and is not the subject of the evaluation score calculation.

In step S701, the CPU 101 determines whether the processing of FIG. 7 has been performed for all objects in the page data display in the preview region 202. Upon determining that the processing has been performed for all objects, the processing of FIG. 7 ends. Upon determining that the processing has not been performed for all objects, the process advances to step S702.

In step S702, the CPU 101 acquires the type of the current object of interest and determines whether the type is the same as the object to be inserted. Here, the CPU 101 determines whether the type of the current object of interest is the character string object. Upon determining that the type is the same, the process advances to step S703. Upon determining that the type is not the same, the process advances to step S707.

In step S703, the CPU 101 acquires the attribute values of the current object of interest. For example, if the current object of interest for the CPU 101 is the character string object 302, the character type "Gothic pointed letter A", the character color "(255, 255, 255)", and the character size "70" are acquired. In step S704, the CPU 101 acquires evaluation parameters different from the attribute values. The evaluation parameters are the distance between the current object of interest and the region 601 decided in step S506, and the number of characters if the current object of interest is a character string object. That is, the evaluation parameter according to this embodiment is the sum of the parameter representing association between the current object of interest and the object to be inserted and the parameter unique to the current object of interest. When calculating the distance, for example, the distance between the barycentric points of the regions of the two objects may be calculated.

In step S705, the CPU 101 calculates the evaluation score of each attribute based on the attribute values and the evaluation parameters acquired in steps S703 and S704. Calculation of the evaluation scores will be described later. In step S706, the CPU 101 selects the next object as the processing target in FIG. 7, and repeats the process from step S701. The processing target object is decided in an order capable of covering all objects included in the page data.

Upon determining in step S702 that the type is not the same, the CPU 101 determines in step S707 whether the current object of interest is a composite object. Upon determining that the current object of interest is a composite object, the process advances to step S708. Upon determining that the current object of interest is not a composite object, the process advances to step S706. For example, a case where the page data is the design template shown in FIG. 3, and it is determined in step S707 that the current object of interest is not a composite object is a case where the current object of interest is an image object. In this case, since the image object that is of a type different from the object to be inserted is not the subject of evaluation score calculation, the process advances to step S706 to select the next object as the processing target. In step S708, the CPU 101 determines whether the composite object that is the current object of interest includes an object of the same type as the object to be inserted. Upon determining that the composite object includes an object of the same type, the process advances to step S703. Upon determining that the composite object does not include an object of the same type, the process advances to step S706.

The evaluation score calculation method in step S705 will be described next. The design application prepares evaluation score calculation formulas for the attributes in advance. The evaluation score calculation formulas weight the object distance, character size, or the number of characters, and the evaluation scores are calculated by $$\text{character color evaluation score} = \text{distance} \times 0.2 + \text{number of characters} \times 0.3 + \text{character size} \times 0.5 \quad (1)$$

$$\text{character size evaluation score} = \text{distance} \times 0.6 + \text{number of characters} \times 0.3 + \text{character size} \times 0.1 \quad (2)$$

$$\text{character type evaluation score} = \text{distance} \times 0.1 + \text{number of characters} \times 0.5 + \text{character size} \times 0.4 \quad (3)$$

The distance is the distance between the character object and the region 601 decided in step S506, the number of characters is the number of characters of the object, and the character size is the character size of the object.

Equation (1) is the calculation formula of the evaluation score of the character color of the object. The distance is weighted by 0.2, the number of characters is weighted by 0.3, and the character size is weighted by 0.5. The character size contributes to the evaluation score more than the remaining elements. Equation (2) is the calculation formula of the evaluation score of the character size. The distance is weighted by 0.6, the number of characters is weighted by 0.3, and the character size is weighted by 0.5. The distance contributes to the evaluation score more than the remaining elements. Equation (3) is the calculation formula of the evaluation score of the character type. The distance is weighted by 0.1, the number of characters is weighted by 0.5, and the character size is weighted by 0.4. The number of characters contributes to the evaluation score more than the remaining elements.

Table 2 shows the evaluation scores of the attributes of all objects (character string objects, including composite objects) of the same type included in the page data, which are calculated in step S705. Table 2 also shows the distances from the objects to the region 601.

TABLE 2

| Object | object distance | Character color evaluation score | Character size evaluation score | character type evaluation score |
|---|---|---|---|---|
| Character string object 301 | 650 | 0.65 | 0.25 | 0.65 |
| Character string object 302 | 600 | 0.48 | 0.38 | 0.64 |
| Composite object 303 | 450 | 0.45 | 0.34 | 0.43 |
| Composite object 304 | 250 | 0.51 | 0.53 | 0.46 |

TABLE 2-continued

| Object | object distance | Character color evaluation score | Character size evaluation score | character type evaluation score |
|---|---|---|---|---|
| Character string object 305 | 430 | 0.46 | 0.44 | 0.52 |
| Character string object 306 | 240 | 0.54 | 0.64 | 0.59 |
| Character string object 309 | 150 | 0.42 | 0.62 | 0.40 |

For example, the character color evaluation score of the character string object 301 will be described. As shown in Table 2, the distance of the character string object 301 is 650 [mm]. As shown in Table 1, the number of characters of the character string object 301 is [6], and the character size is 210 [pts]. In this embodiment, the relative ratio of each attribute value to the maximum one of the attribute values of all objects of the same type in the page data is calculated. For example, in Table 2, the maximum value of the distance is 650 [mm] of the character string object 301. Hence, the relative ratio of the distance of the character string object 301 is calculated as 650/650=1. In Table 1, the maximum value of the number of characters is "12" of the character string object 302. Hence, the relative ratio of the number of characters of the character string object 301 is calculated as 6/12=0.5. In Table 1, the maximum value of the character size is 210 [pts] of the character string object 301. Hence, the relative ratio of the character size of the character string object 301 is calculated as 210/210=1.

The thus calculated relative ratios of the attribute values to the maximum values are applied to equation (1). The relative ratios are used to enable handling the numerical values between different units. As is apparent from equation (1), the higher the relative ratios of the number of characters and the character size are, the higher the evaluation score of the character color is. This indicates that the influence on the display image becomes large as the number of characters and the character size become large. However, as the relative ratio of the distance, a value (complement) obtained by subtracting 1 from the calculated value is used. This is because the degree of influence on the object to be inserted is assumed to be smaller as the distance increases. That is, the character color evaluation score of the character string object 301 is calculated by character color evaluation score=(1−1)×0.2+0.5×0.3+ 1×0.5=0.65

Equations (2) and (3) are calculated by the same method as equation (1).

Figure 8:
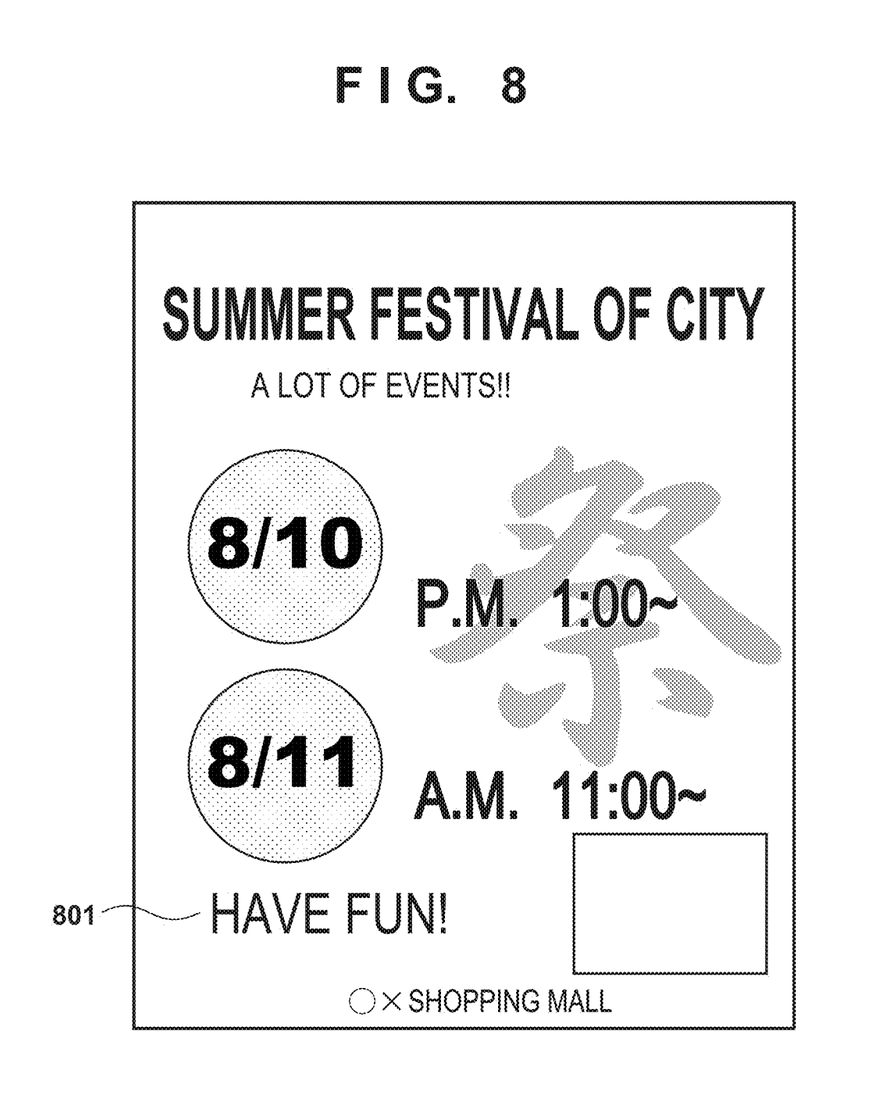
FIG. 8 is a view showing a result of inserting a character string object having changed attribute values.

As shown in Table 2, the evaluation score of the character color is the highest for the character string object 301. The evaluation score of the character size is the highest for the character string object 306. The evaluation score of the character type is the highest for the character string object 301. That is, these objects of the attributes have a high degree of influence on the poster in the region 601, and the attribute values of the objects are decided (determined) as the attribute values of the object to be inserted. That is, for the character string object to be inserted, the character color and the character type are decided as white (255, 255, 255) and round gothic A, respectively, like the character string object 301, and the character size is decided as 80 point, like the character string object 306. The CPU 101 lays out, in the region 601, an object formed by changing the attribute values of the object to be inserted to the above attribute values. As a result, the effect of making the inserted object naturally harmonize with the poster of the design template shown in FIG. 3 is obtained. FIG. 8 is a view showing the result of laying out the character string object with the changed attribute values in the region 601. As shown in FIG. 8, a character string object "Have fun!" is inserted into the region 601. The page data obtained as shown in FIG. 8 is output by an arbitrary method. For example, print processing is performed to output the page data to an external printer via the communication IF 109, or display processing is performed to output the page data to the display 107.

As described above, attribute values are selectively extracted from the objects existing in the editing target page data and applied to the object to be inserted. This makes it possible to obtain a design with the object inserted without changing the existing design of the page data.

A case where a character string object is inserted has been described above. This embodiment is also applicable to a case where a desired image object is inserted. In this case, the attribute values of the image object to be inserted are an image size, image color, the thickness of lines of the image, and the like. As the image size, for example, the size of a circumscribed rectangle to the image may be used. Evaluation values are calculated for the attributes of image objects (composite objects including image objects) existing in the editing target page data. The evaluation value calculation formulas are prepared in advance, like equations (1) to (3). Note that the layout region of the image object to be inserted is decided using the method described with reference to FIGS. 5, 6A, and 6B. The attribute value of the image object having the highest evaluation value for each attribute is decided as the attribute value of the image object to be inserted. As a result, even when the desired image object is inserted, a design with the object inserted can be obtained without changing the existing design of the page data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-070075, filed Mar. 28, 2014, which is hereby incorporated by reference herein in its entirety.

What is claimed is:

1. An image processing apparatus comprising:
an obtaining unit configured to obtain, for each of a first object and a second object, each having an attribute, a first value of the attribute of the first object and a second value of the attribute of the second object, wherein the first object and the second object have been laid out in an image;
an evaluation unit configured to calculate, where each of the first object and the second object has a feature, (a) for the first object, a first evaluation score of the first value each of the values obtained by the obtaining unit, based on a parameter indicating the feature of the first object and (b) for the second object, a second evaluation score of the second value obtained by the obtaining unit, based on a parameter indicating the feature of the second object;
a selection unit configured to, for a new object having the attribute, select, from the first value and the second value, a value of the attribute of the new object, based on the first evaluation score and the second evaluation score calculated by the evaluation unit; and
a display unit configured to cause a display device to display the image, in which the new object having the value of the attribute selected by the selection unit is inserted.

2. The image processing apparatus according to claim 1, further comprising a position decision unit configured to determine, based on a position of the first object or a position of the second object in the image, a position to insert the new object.

3. The image processing apparatus according to claim 2, wherein the position decision unit specifies a rectangular region to lay out the new object.

4. The image processing apparatus according to claim 3, wherein the position decision unit specifies the rectangular region to lay out the new object by specifying a reference rectangular region and moving each side of the specified reference rectangular region until the side comes into contact with a neighboring object.

5. The image processing apparatus according to claim 4, wherein the position decision unit specifies the reference rectangular region at a position not to overlap the first object or the second object.

6. The image processing apparatus according to claim 1, wherein the first object and the second object are character string objects or image objects.

7. The image processing apparatus according to claim 6, wherein in a case where the first object and the second object are character string objects, the attribute is a character color, a character size, or a font.

8. The image processing apparatus according to claim 1, wherein the first object, the second object, and the new object are character string objects, and
wherein the parameter of the first object indicates the number of characters in the first object, and the parameter of the second object indicates the number of characters in the second object.

9. The image processing apparatus according to claim 1, wherein the evaluation unit calculates the first evaluation score and the second evaluation score, based on a relative ratio between the parameter of the first object and the parameter of the second object.

10. The image processing apparatus according to claim 1, wherein the evaluation unit calculates the first evaluation score further based on a distance between the first object and a region where a new object is to be inserted, and calculates the second evaluation score further based on a distance between the second object and the region where the new object is to be inserted.

11. The apparatus according to claim 10, wherein the evaluation unit calculates the first evaluation score and the second evaluation score by weighting the parameter of the first object and the parameter of the second object and the distance.

12. An image processing method executed by an image processing apparatus, the image processing method comprising:
obtaining, for each of a first object and a second object, each having an attribute, a first value of the attribute of the first object and a second value of the attribute of the second object, wherein the first object and the second object have been laid out in an image;
calculating, where each of the first object and the second object has a feature, (a) for the first object, a first evaluation score of the first value, based on a parameter indicating the feature of the first object, and (b) for the second object, a second evaluation score of the second value, based on a parameter indicating the feature of the second object;
selecting, for a new object having the attribute, from the first value and the second value, a value of the attribute of the new object, based on the first evaluation score and the second evaluation score; and
causing a display device to display the image, in which the new object having the selected value of the attribute is inserted.

13. The image processing method according to claim 12, further comprising a position determining, based on a position of the first object or a position of the second object in the image, of a position to insert the new object.

14. The image processing method according to claim 13, wherein the position determining specifies a rectangular region to lay out the new object.

15. The image processing method according to claim 14, wherein the position determining specifies the rectangular region to lay out the new object by specifying a reference rectangular region and moving each side of the specified reference rectangular region until the side comes into contact with a neighboring object.

16. The image processing method according to claim 15, wherein the position determining specifies the reference rectangular region at a position not to overlap the first object or the second object.

17. The image processing method according to claim 12, wherein the first object and the second object are character string objects or image objects.

18. The image processing method according to claim 17, wherein in a case where the first object and the second object are character string objects, the attribute is a character color, a character size, or a font.

19. The image processing method according to claim 12, wherein, the first object, the second object, and the new object are character string objects, and
wherein the parameter of the first object indicates the number of characters in the first object, and the parameter of the second object indicates the number of characters in the second object.

20. The image processing method according to claim 12, wherein the first evaluation score and the second evaluation score are calculated based on a relative ratio between the parameter of the first object and the parameter of the second object.

21. A non-transitory computer-readable storage medium storing a program that causes a computer to execute a method comprising:
obtaining, for each of a first object and a second object, each having an attribute, a first value of the attribute of the first object and a second value of the attribute of the second object, wherein the first object and the second object have been laid out in an image;
calculating, where each of the first object and the second object has a feature, (a) for the first object, a first evaluation score of the first value, based on a parameter indicating the feature of the first object, and (b) for the second object, a second evaluation score of the second value, based on a parameter indicating the feature of the second object;
selecting, for a new object having the attribute, from the first value and the second value, a value of the attribute of the new object, based on the first evaluation score and the second evaluation score; and
causing a display device to display the image, in which the new object having the selected value of the attribute is inserted.

22. The non-transitory computer-readable storage medium according to claim 21, the method further comprising a position determining, based on a position of the first object or a position of the second object in the image, of a position to insert the new object.

23. The non-transitory computer-readable storage medium according to claim 22, wherein the position determining specifies a rectangular region to lay out the new object.

24. The non-transitory computer-readable storage medium according to claim 23, wherein the position determining specifies the rectangular region to lay out the new object by specifying a reference rectangular region and moving each side of the specified reference rectangular region until the side comes into contact with a neighboring object.

25. The non-transitory computer-readable storage medium according to claim 24, wherein the determining specifies the reference rectangular region at a position not to overlap the first object or the second object.

26. The non-transitory computer-readable storage medium according to claim 21, wherein the first object and the second object are character string objects or image objects.

27. The non-transitory computer-readable storage medium according to claim 26, wherein in a case where the first object and the second object are character string objects, the attribute is a character color, a character size, or a font.

28. The non-transitory computer-readable storage medium according to claim 21, wherein, the first object, the second object, and the new object are character string objects, and
wherein the parameter of the first object indicates the number of characters in the first object, and the parameter of the second object indicates the number of characters in the second object.

29. The non-transitory computer-readable storage medium according to claim 21, wherein the first evaluation score and the second evaluation score are calculated based on a relative ratio between the parameter of the first object and the parameter of the second object.

30. An image processing method executed by an image processing apparatus, the image processing method comprising:
obtaining (a) a first character size of a first character string object and/or a first character color of the first character string object and (b) a second character size of a second character string object and/or a second character color of the second character string object, wherein the first character string object and the second character string object have been laid out in an image;
calculating, for the first character string object, a first evaluation score of the obtained first character size and/or the obtained first character color, based on a number of characters of the first character string object;
calculating, for the second character string object, a second evaluation score of the obtained second character size and/or the obtained second character color, based on a number of characters of the second character string object;
selecting, for a new character string object, a character size and/or a character color, wherein (a) in a case where the first character size and the second character size were obtained in the obtaining, the character size of the new character string object is selected from the obtained first character size and the obtained second character size, based on the first evaluation score and the second evaluation score, and (b) in a case where the first character color and the second character color were obtained in the obtaining, the character color of the new character string object is selected from the obtained first character color and the obtained second character color, based on the first evaluation score and the second evaluation score; and
causing a display device to display the image, in which the new character string object having the selected character size and/or the selected character color is inserted.

31. The method according to claim 30, wherein in the obtaining, both of the first character size and the first character color are obtained and both of the second character size and the second character color are obtained, and
wherein in the selecting, both of the character size of the new character string object and the character color of the new character string object are selected.

32. The method according to claim 30, wherein the first evaluation score is calculated further based on a distance between the first character string object and the region where the new character string object is to be inserted, and
wherein the second evaluation score is calculated further based on a distance between the second character string object and the region where the new character string object is to be inserted.

33. The method according to claim 32, wherein, in the calculating, an evaluation score of a character size is calculated by weighting the number of characters and the distance in a first weighting ratio, and
wherein an evaluation score of a character color is calculated by weighting the number of characters and the distance in a second weighting ratio that is different from the first weighting ratio.

\* \* \* \* \*